United States Patent [19]

Castellano et al.

[11] 4,078,517
[45] Mar. 14, 1978

[54] APPARATUS FOR PRODUCING ROUGH BREADING TEXTURE ON FRIED CHICKEN

[75] Inventors: Carmine T. Castellano, White Plains, N.Y.; Robert L. Morris, Old Greenwich, Conn.

[73] Assignee: International Telephone and Telegraph Corporation, Nutley, N.J.

[21] Appl. No.: 652,691

[22] Filed: Jan. 27, 1976

[51] Int. Cl.² .................................................. B05C 19/00
[52] U.S. Cl. ......................................... 118/16; 118/18; 118/24
[58] Field of Search .................. 118/16, 18, 24, 324; 198/102; 156/602

[56] References Cited

U.S. PATENT DOCUMENTS

| 1,460,189 | 6/1923 | Woolf | 118/24 |
| 2,300,396 | 11/1942 | Bookidis | 118/16 |
| 2,731,942 | 1/1956 | Anderson | 118/16 |
| 3,547,075 | 12/1970 | Johnson | 118/24 X |
| 3,703,382 | 11/1972 | Harkey | 118/16 X |

*Primary Examiner*—John P. McIntosh
*Attorney, Agent, or Firm*—John T. O'Halloran; Thomas M. Marshall

[57] ABSTRACT

To a breader conveyor there is added a plurality of restrained flow cascading tumbling conveyors positioned to produce roughness of the breading. Slip plates at the terminal portions of the conveyors act to restrain the free flow of the battered and flour breaded chicken until pushed off onto a following conveyor. The breaded chicken in excess flour tumbles from one conveyor to another to produce a rough, flaky breading texture. The breaded chicken is then separated from the excess flour by an output wire conveyor and is fried or cooked in the conventional manner.

5 Claims, 2 Drawing Figures

U.S. Patent  March 14, 1978  4,078,517
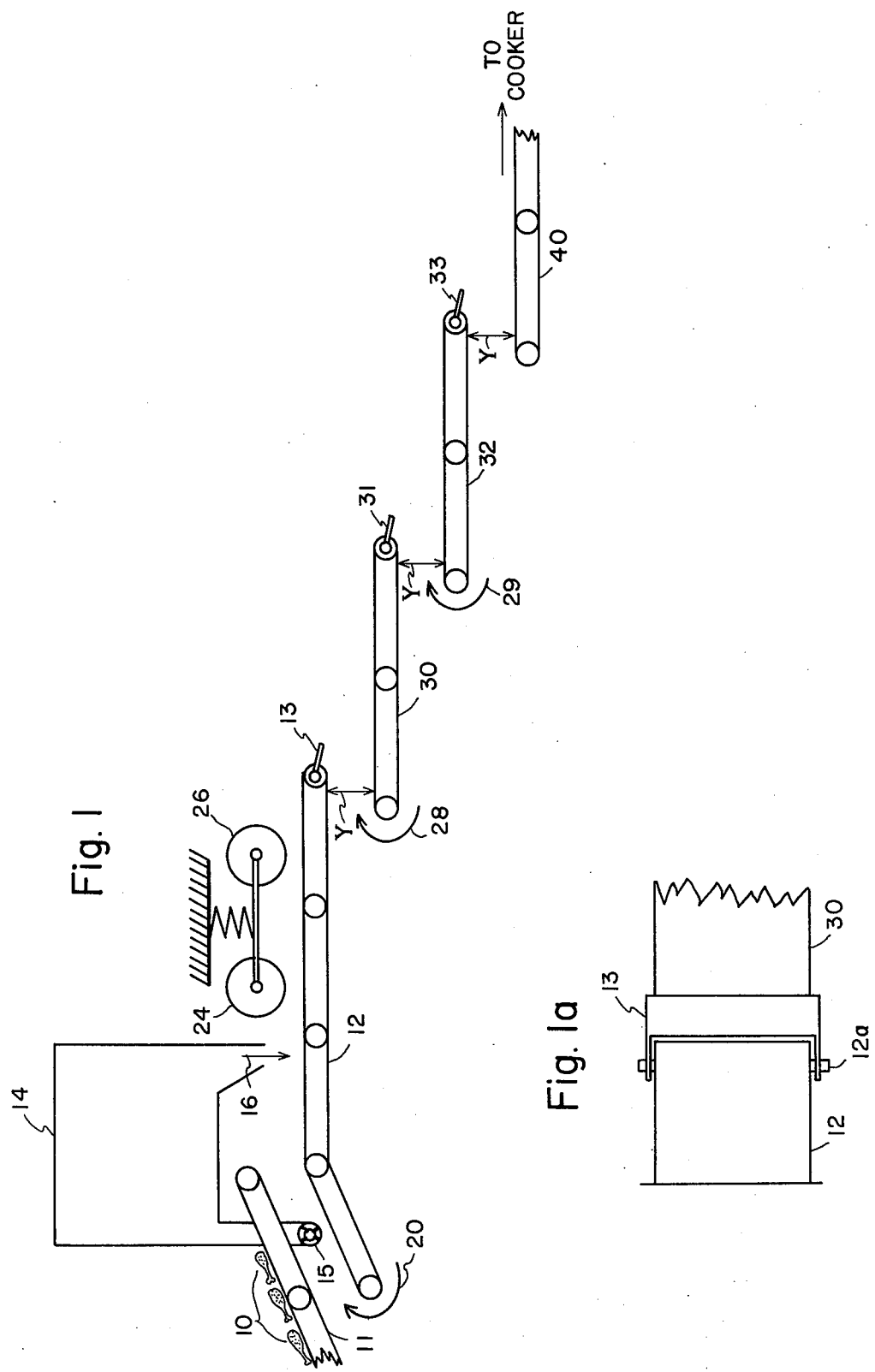

APPARATUS FOR PRODUCING ROUGH BREADING TEXTURE ON FRIED CHICKEN

BACKGROUND OF THE INVENTION

This invention relates to apparatus for producing a rough, flaky breading texture on fried chicken. Rough breading texture on fried chicken has thus far been obtained by tumbling battered and flour breaded chicken pieces in a drum. With flour as the breading agent, chicken pieces which are breaded in a rotating, baffled drum tumbler and are then fried and/or cooked, have a rough, flaky breading surface and a rough, crunchy breading texture. This type surface and texture is characteristic of the appetizing appearance and good eating quality of home fried chicken.

Associated with a drum tumbler, however, are large flour and batter losses in the form of unusable crumbs, which are a result of the disassociation of batter and flour from the chicken pieces during tumbling in the drum. Also because of the random arrangement of the breaded chicken pieces emerging from the tumbler, the chicken must be manually positioned on conveyors prior to frying or cooking so pieces are not bunched together and result in unfried or uncooked areas on the chicken. If a high production volume is required, it may be also necessary to spread the breaded chicken from the relatively narrow conveyors transporting the pieces out of the tumbler onto wider conveyors leading into the fryer or oven.

Also, according to the prior art, there are breading machines which perform the breading operation solely on straight conveyors in which the battered chicken pieces are placed on a layer of flour and are then covered by more flour so there are no exposed areas. The covered pieces may then be slightly compressed with flexible compression rollers in order to more intimately join the batter and the flour. The breaded chicken is then separated from the excess by allowing the flour to fall through wire or O-ring conveyors. The chicken is then fried or cooked and the excess flour is sifted and recycled into the breader. This breading operation using flat-bed conveyor units has less flour and batter losses, requires less manual piece handling, and is more controlled than the drum tumbler system, but does not produce a rough, flaky breading.

SUMMARY OF THE INVENTION

An object of the invention is to provide an improved apparatus for producing a rough, flaky breading on fried chicken.

According to the broader aspects of the invention, a plurality of restrained flow cascading belt conveyors are used to produce varying degrees of roughness of the breading. The degree of roughness varies with the number of conveyors and the distance of drop from each succeeding conveyor. Roughness is further increased by utilizing slip plates of varying widths at the end of the conveyors. The slip plates act to restrain the free flow of the battered and floured chicken pieces which remain on the plates until excess flour or other pieces that follow push them off onto a following conveyor.

BRIEF DESCRIPTION OF THE DRAWING

The invention will best be understood if reference is made to the Figures, in which:

FIG. 1 shows an arrangement for producing rough breading texture on fried chicken; and FIG. 1A shows a partial top view of the slip plate according to the invention.

DESCRIPTION OF THE PREFERRED EMBODIMENTS

This invention involves the use of a plurality of restrained flow cascading tumbling solid belt conveyors with a breader conveyor to produce varying degrees of roughness of the breading. The degree of roughness increases with the number of tumbling conveyors and the distance of the drop from each succeeding conveyor. Roughness can be further increased by utilizing slip plates of varying widths and orientation at the ends of the conveyors. The slip plates act to restrain the free flow of the battered and breaded chicken pieces. The chicken pieces remain on these plates until excess flour or other pieces that follow push then off onto the following conveyor. This pushing action combined with the orientation of the slip plates causes a sliding action which distorts, folds and roughens the batter-breading matrix on the chicken surface. The tumbling conveyors are positioned between the breader conveyor and the wire conveyor used to separate the breaded chicken pieces from the excess flour. The tumbling from one solid belt conveyor to the other and the sliding action on the slip plates, in the presence of excess flour, produces a rough, flaky breading texture. The chicken is then fried or cooked in a conventional manner.

Although quite different in nature, the cascaded conveyors act very much like the drum tumbler. The drops that the breaded chicken experiences on the conveyors are similar to the free fall drops experienced in a drum tumbler. Excess flour on the conveyors, similar to that in a tumbler, allows for coverage of batter that is exposed, folded or wrinkled during the drops from successive conveyors. The action of the breaded chicken on the slip plates is similar to the sliding motion of the pieces against the walls and baffles of a drum tumbler. The degree of roughness of the breading texture can be controlled by controlling the movement and action of the chicken pieces on the conveyors. Roughness of breading is increased by increasing the distance of the drops, the number of drops or the number of tumbling conveyors, and the number of slip plates. The number of tumbling conveyors can vary from one to four or more. However, the cost and the space needed for the equipment increases with the number of conveyors. Two tumbling conveyors are adequate in producing a rough, flaky breading and are not prohibitive in cost or space. The conveyors can be horizontal or sloped. Slip plates can be attached to any number or all of the conveyors, depending on the desired degree of roughness of the breading.

Referring now to FIG. 1, the arrangement according to the invention is illustrated. Battered chicken pieces 10 are conveyed by an input wire feed conveyor 11 for depositing the battered chicken pieces 10 onto the flour breading conveyor. A typical batter surrounding the individual chicken pieces 10 is made up of about 35% flour, about 55% water and about 10% salt and seasoning. A flour hopper 14 has an auger feed output 15 and a flour fall output 16. The auger output 15 places a bed of flour onto the topside of conveyor belt 12 which is moving in the direction of arrow 20 in a continuous loop. The battered chicken pieces 11 are dropped onto the flour bed of the conveyor 12 and are conveyed through the fall of flour from the output 16. The battered chicken pieces which have been placed on the layer of flour and then covered by more flour from the hopper output 16 are then slightly compressed by means of flexible compression rollers 24, 26 while being conveyed towards a first slip plate 13 mounted at the terminal end of conveyor 18. As shown in FIG. 1A, the slip plate 13 may be mounted or connected to the shaft 12a of the conveyor and retained in a predetermined position. The belt conveyors are the typical synthetic rubbercoated conveying belts used in the industry, such as "Canery-Tex" belts, and may vary in width according to the production requirements with 1 to 3 feet being typical widths.

The tumbling conveyors 30, 32 are also moving in a continuous loop in the direction of the arrows 28, 29. The associated slip plates 31, 33 are also mounted at the terminal ends of the tumbling conveyors. The plates 13, 31 and 33 are the same width as the conveyor belts and each extends for ½ inch to 3 inches beyond the end of the conveyor, and preferably for about 2 inches. The orientation of the plates can be adjusted to increase or decrease the restraining force to the free flow of chicken. A large negative or downward slope would have less restraining force than a less steep slope and, therefore, would not produce as flaky a breading. A downward slope of 30° from the horizontal plane is a typical operating value which results in a rough, flaky breading. The conveyors 30, 32 40 are displaced below each other a distance $\gamma$ of about 1 inch to 4 inches, and preferably about 3 inches. The overall length of the tumbling conveyors 30, 32 is approximately ½ ft. to 3 feet, and preferably about 2 feet in effective length.

After the battered and flour breaded chicken pieces fall free of the last slip plate 33, they are caught by wire conveyor 40 which carries the pieces to the cooker or fryer. The excess flour is captured by a trough located under the wire conveyor 40 in a conventional manner. The tumbling conveyors are usually driven at the same speed as the breading conveyor 12, although the width and/or speed may be slightly different. The slip plates 13, 31, 33 act to restain the free flow of the battered and floured chicken pieces which remain on the slip plates until excess flour or pieces that follow push them off onto the next conveyor. The combination of the falling between the conveyors and the restraining action by the slip plates of the battered chicken pieces in the presence of excess flour produces a rough, flaky breaded texture. The resulting texture is similar to that produced by a tumbling drum breader but with significantly less flour losses and chicken handling, thereby providing an equivalent or better product at lower cost.

Although this apparatus has been specifically designed for use with chicken, it can also be employed in producing a rough, flaky breading on other food products which are breaded with a batter and flour matrix. For example, shrimp, mushrooms and other particulate foods can be breaded using the apparatus of the invention.

There has been described according to the preferred embodiment of the invention, a breader conveyor with added restrained flow cascading conveyors placed after and below the breader conveyor. Slip plates mounted at the end of each of the conveyors act to restrain the free flow of the chicken pieces so that the necessary combination of tumbling in the presence of excess flour and sliding on the slip plates produces the rough, flaky breading texture that is desired in the end product.

While we have described above the principles of our invention in connection with specific apparatus and methods, it is to be clearly understood that this description is made only by way of example and not as a limitation to the scope of our invention as set forth in the objects thereof and in the accompanying claims.

We claim:

1. Apparatus for producing a rough, flaky breading texture on chicken pieces and the like, comprising:
 a breading conveyor to receive battered pieces for coating with flour having a slip plate restraining means mounted at the terminal portion thereof;
 a flour hopper having means for placing a layer of flour on said breading conveyor positioned to deposit said layer of flour on said breading conveyor prior to the depositing of said battered pieces on said breading conveyor and having additional means for covering said battered pieces with more flour from the hopper positioned over an intermediate portion of said breading conveyor;
 a plurality of elongated conveyors each having an input portion and a terminal portion including slip plate restraining means mounted at the terminal portion thereof for restraining the free flow of said battered and floured bread pieces until forced off onto the input portion of a subsequent one of said plurality of conveyors, each of said conveyors moving in the same direction and being positioned in partially overlapping relationship so that the input portion of each subsequent conveyor extends longitudinally beyond the terminal portion of the preceding conveyor, each of said restraining means ending in a position which is vertically spaced above the input portion of each subsequent conveyor to effect tumbling of said battered and coated pieces as such as forced off onto said subsequent conveyor;
 means for receiving and separating excess flour from the tumbled pieces.

2. The invention of claim 1, wherein the restraining means are slip plates predeterminately positioned downward from conveying plane.

3. The invention of claim 1, wherein each of the slip plates extend 0.5 to 3.0 inches beyond the end of the conveyors.

4. The invention of claim 1 wherein said plurality of restrained flow cascading conveyors are each positioned 1 to 4 inches below the preceding conveyor and have an effective conveying length of ½ to 3 feet.

5. The invention of claim 1, including means for slightly compressing said battered and coated pieces.

* * * * *